United States Patent

Dodt et al.

[11] 4,164,994
[45] Aug. 21, 1979

[54] HYDRAULIC EDDY BRAKE

[75] Inventors: Hans-Walter Dodt, Darmstadt; Dieter Kraft, Griesheim, both of Fed. Rep. of Germany

[73] Assignee: Firma Carl Schenck AG, Darmstadt, Fed. Rep. of Germany

[21] Appl. No.: 832,908

[22] Filed: Sep. 13, 1977

Related U.S. Application Data

[63] Continuation of Ser. No. 697,956, Jun. 21, 1976, abandoned.

[30] Foreign Application Priority Data

Aug. 19, 1975 [DE] Fed. Rep. of Germany ....... 2536794

[51] Int. Cl.$^2$ ............................................. F16D 57/02
[52] U.S. Cl. ...................................... 188/296; 60/339;
60/363; 188/264 B; 308/36.5
[58] Field of Search ................... 188/264 B, 290, 296;
192/3.21; 60/339, 357, 358, 359, 363, 366;
308/3.5, 36.5; 64/1 S

[56] References Cited

U.S. PATENT DOCUMENTS

| | | | |
|---|---|---|---|
| 2,341,122 | 2/1944 | Schmidt | 188/296 |
| 2,537,943 | 1/1951 | Brown | 308/36.5 |
| 2,889,013 | 6/1959 | Schneider | 188/296 |
| 2,976,960 | 3/1961 | Bathurst | 188/296 |
| 3,383,910 | 5/1968 | Tanaka | 188/296 |
| 3,888,335 | 6/1975 | Hanke | 188/296 |

FOREIGN PATENT DOCUMENTS

| | | | |
|---|---|---|---|
| 802030 | 12/1950 | Fed. Rep. of Germany | 188/296 |
| 1006180 | 4/1957 | Fed. Rep. of Germany | 188/296 |
| 2451024 | 5/1976 | Fed. Rep. of Germany | 188/296 |

*Primary Examiner*—Edward R. Kazenske
*Attorney, Agent, or Firm*—W. G. Fasse; W. W. Roberts

[57] ABSTRACT

A hydraulic eddy brake has a rotor and a stator both forming an eddy chamber. Liquid supply conduits lead to the center of the eddy chamber. The rotor shaft is sealed relative to the housing formed by the stator. The sealing is accomplished by noncontacting sealings. Leakage liquid is discharged to respective chambers located between the bearings and the eddy chamber proper. A gap is provided between the shaft and the housing. This gap is connected with the center of the eddy chamber through a liquid feedback which may include an intermediate chamber and respective liquid feedback conduits whereby the pressure at the point of leakage is minimized. Such brakes are used as absorption dynamometers to measure torque.

10 Claims, 3 Drawing Figures

HYDRAULIC EDDY BRAKE

This is a continuation of application Ser. No. 697,956 filed June 21, 1976, now abandoned.

BACKGROUND OF THE INVENTION

The present invention relates to hydraulic eddy brakes having at least one stator and one rotor which together form an eddy chamber. Liquid supply conduit means are connected to lead substantially into the center of the eddy chamber. Leakage liquid discharge chambers are located between the bearings of the brake and the eddy chamber proper whereby the rotor shaft of the eddy brake is sealed relative to the stationary housing by noncontacting sealing means. Such brakes are used a dynamometers.

Hydraulic eddy brakes comprise at least one rotor and a stator provided with recesses in their respective facing surfaces. Such recesses are uniformly or symmetrically distributed over the respective circumference or rather annular surface to form one or more eddy chambers. Water eddies are produced in these chambers when the rotor is rotated. The power supplied to the brake is converted into heat due to the hydraulic eddy action. The heat in turn is taken up by the cooling water flowing through the apparatus. When the rotor rotates in the stator a rotating torus shaped body of water is produced in the eddy chamber formed by the rotor and the stator. This body of water causes substantial pressures along the walls of the eddy chamber including along the inner and outer circumferences of the eddy chamber. Due to the pressure along the outer circumference of the eddy chamber the water will flow through a liquid discharge means out of the eddy brake. Incidentally, water is the most commonly used liquid in such brakes. However, any other suitable liquid could also be used, for example oil or the like.

Heretofore it was customary to seal the eddy chamber at its inner circumference by sealing means of elastic materials, for example, so called lip type packings to reduce pressure loss. However, such packings are subject to substantial wear and tear calling for frequent maintenance and overhaul work of the eddy brake usually after relatively short periods of operation such as about two thousand operational hours. Thus, heretofore it was necessary to practically disassemble the entire brake structure before replacing the sealing packings. Accordingly such overhaul work is expensive and time consuming.

German patent publication No. 1,006,180 discloses an eddy brake in which the rotor shaft is sealed without elastic packings. For this purpose the outer walls of the rotor are provided with radial ribs. The rotor forms only a quarter section of the cross section of the eddy chamber. The rotor shaft is sealed relative to the brake housing by means of labyrinth packings or seals. Spaces for discharging leakage liquid are arranged between the labyrinth packings and the bearings of the rotor shaft. So called gland sealing rings are located in said spaces. This type of structure is rather expensive because of the close tolerances to be maintained for the labyrinth packings which are not supposed to contact the rotor shaft. Another drawback of this type of structure is seen in that it is relatively sensitive to rough operating conditions. Besides, due to the stator which is divided in half, the power of such hydraulic eddy brakes is substantially reduced relative to other conventional eddy brakes of the same dimensions.

OBJECTS OF THE INVENTION

In view of the above it is the aim of the invention to achieve the following objects, singly or in combination:

to construct a hydraulic eddy brake without elastic packings for sealing the rotor shaft relative to the housing;

to provide a hydraulic eddy brake which has substantially the same power rating as a conventional eddy brake of equal dimensions but without requiring elastic sealing means for the rotor shaft;

to construct the eddy brake in such a manner that by means of a liquid feedback the pressure difference at the points where leakage may occur, is minimized; and to minimize the quantity of leakage liquid.

SUMMARY OF THE INVENTION

According to the invention there is provided an eddy brake in which the rotor shaft rotates in a gap formed between the outer circumference of the rotor shaft and the inner surface of a bore extending through the stator. This gap leads to liquid discharge means and liquid feedback means connect the gap back to the center of the eddy chamber. The feedback means may comprise in one embodiment of the invention a feedback chamber operatively connected to said gap and feedback conduit means connecting said chamber back substantially to the center of the eddy chamber. According to another embodiment of the invention, the feedback means comprise feedback conduit means connecting said gap directly to the liquid supply conduit means, which in turn substantially into the center of the eddy chamber. Preferably, the rotor is constructed as a so called double rotor supported for rotation inside the stator of the eddy brake whereby the rotor and the stator define the eddy chamber. The width of the ring gap in which the rotor shaft rotates is preferably about 1/300th of the radius of the bore extending axially through the stator.

The advantages of the hydraulic eddy brake according to the invention are especially seen in the fact that without elastic sealing packings the brake has a normal power rating as well as a normal water consumption while simultaneously achieving operational periods which are about five times longer than in comparable eddy brakes with elastic sealing packings which are required in conventional hydraulic eddy brakes and which have been eliminated according to the invention. Another important advantage of the present eddy brakes is seen in that their manufacture is simplified as compared to conventional eddy brakes and they may also be operated at high rpms.

BRIEF FIGURE DESCRIPTION

In order that the invention may be clearly understood, it will now be described in greater detail by way of example, with reference to the accompanying drawings, wherein.

DETAILED DESCRIPTION OF PREFERRED EXAMPLE EMBODIMENTS

Figure 1:
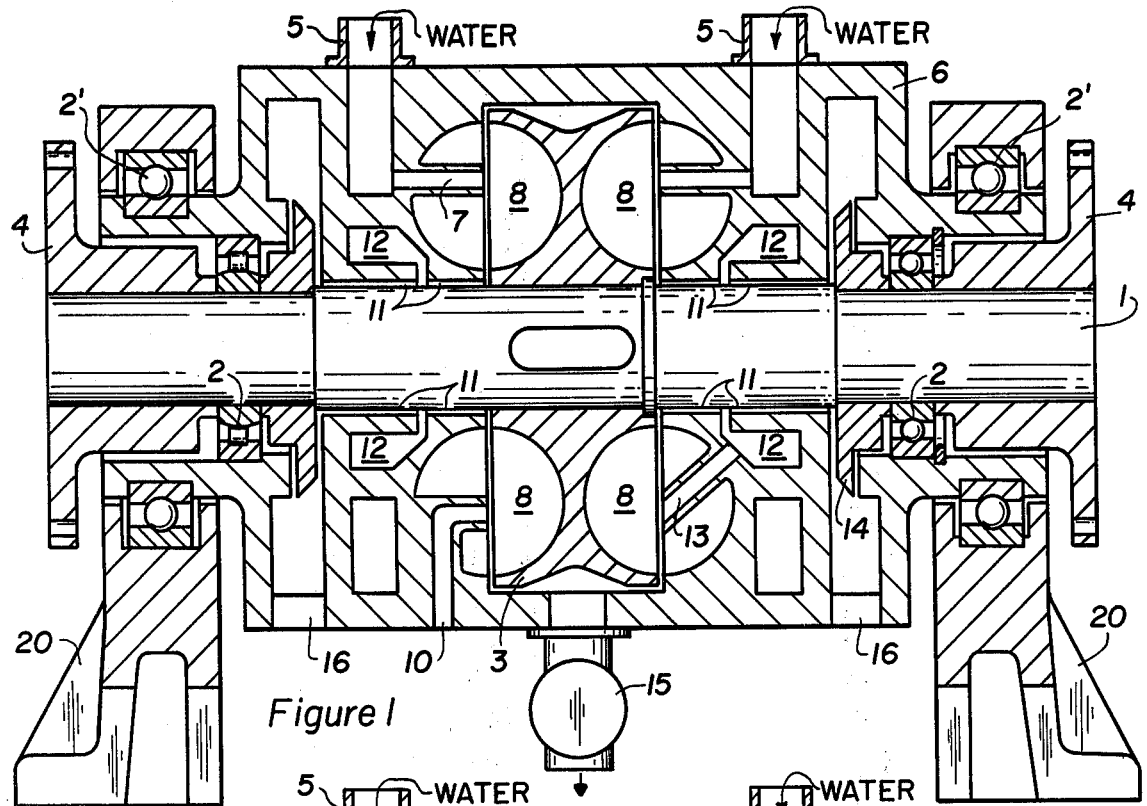
FIG. 1 shows a sectional view through an eddy brake according to the invention wherein the gap surrounding the rotor shaft is connected to a feedback chamber which in turn is connected substantially centrally to the eddy chamber.

FIG. 1 shows a sectional view of a hydraulic eddy brake according to the invention comprising a rotor shaft 1 rotatably supported in a housing 6 which simultaneously forms the stator. The rotor 3 is constructed as a so called double rotor which is rigidly secured to the shaft 1 for example by tongue and groove means so that the rotor 3 rotates with the shaft 1. The rotor shaft 1 is supported by bearings 2 for rotation by drive means not shown. The drive means such as a motor drive shaft would be connected to one of the flanges 4. The brake liquid such as water is supplied through liquid supply means including an inlet port 5 leading into a supply conduit 7 which in turn lead substantially into the center of an eddy chamber 8 formed by the double rotor 3 and the housing 6 which acts as a stator. Further bearing means 2' support the housing 6 relative to a frame structure such as end shields 20 whereby the housing or stator 6 may perform pendulum motions relative to the rotor.

The water flows through the port 5 and the conduit 7 substantially into the center of the eddy chamber 8 formed by the rotor 3 and the stator or housing 6. At the beginning of the filling of the eddy chamber 8 the air in said chamber escapes through the vent opening 10. Prior to the filling of the chamber 8 the latter is at atmospheric pressure due to said vent opening 10. The rotor shaft extends through an axial bore in the housing 6 on both sides of the rotor 3. According to the invention the bore in the housing 6 has an inner diameter slightly larger than the outer diameter of the rotor shaft 6 whereby a ring gap 11 is formed around the rotor shaft on both sides of the rotor 3. Preferably the ring gap 11 has a width corresponding to about 1/300th of the bore radius in the housing 6. According to the invention the gap 11 is connected by feedback means into the center of the eddy chamber 8. For this purpose FIG. 1 shows a feedback chamber 12 connected on the one hand to the gap 11 and on the other hand to a feedback conduit 13 into the center of the eddy chamber 8. The gap 11 opens at each end into leakage liquid discharge passages 16. Cover shields 14 rigidly secured to the rotor shaft 1 rotate with the shaft and protect the bearings 2 against spray water.

The water which has been filled into the eddy chamber 8 through the port 5 and conduit 7 forms a closed so called water ring which rotates with the rotor and which causes a substantial pressure on the wall of the eddy chamber 8. The pressure build-up on the inwardly facing walls surrounding the chamber 8 may be in the range of about 7 bar or higher. This pressure forces some of the rotating water ring through the gap between the double rotor 3 and the housing 6 where this water my escape through the run off port 15. This run off is provided in order to permit the supply of fresh water to thereby avoid the overheating of the water in the rotating water ring.

Further, the rotating water ring also generates a substantial pressure at the inner circumference or radius of the eddy chamber 8 where the pressure may be in the order of about 5 bar. Due to this pressure at the inner circumference of the eddy chamber 8 a substantial quantity of water also escapes through the gap 11. The water escaping through the gap 11 enters into the feedback chamber 12 and through the feedback conduit 13, it is returned into the eddy chamber 8 which is kept at atmospheric pressure through the vent 10. The width of the ring gap 11, the connection between the gap 11 and the feedback chamber 12, the spacing of this just mentioned connection from the inner diameter of the eddy chamber 8 and the diameter of the feedback conduit 13 are dimensioned so that a low pressure is established in the feedback chamber 12, for example, a pressure of 0.05 bar. This pressure is sufficient for returning the water collected in the feedback chamber 12 back into the eddy chamber 8. Further, this relatively very low pressure also prevails in the remaining portion of the ring gap 11 to move the water toward the bearings 2 and into the leakage discharge chamber 16. It is an advantage of the present invention that the low pressure differential results in a correspondingly small quantity of leakage which can be kept away from the bearings 2 with certainty by the spray water shields 14 rigidly secured to the rotor shaft 1. Accordingly, the leakage loss of liquid is small because of the low pressure just mentioned and since the larger proportion of leakage liquid is returned through the feedback chamber 12 and the conduit 13 into the eddy chamber 8. This feature of the invention in turn has the advantage that the water requirement or rather the water consumption of the present eddy brake is low and the fixed operational cost is substantially comparable to that of conventional eddy brakes with rubber elastic sealing packings.

Figure 2:
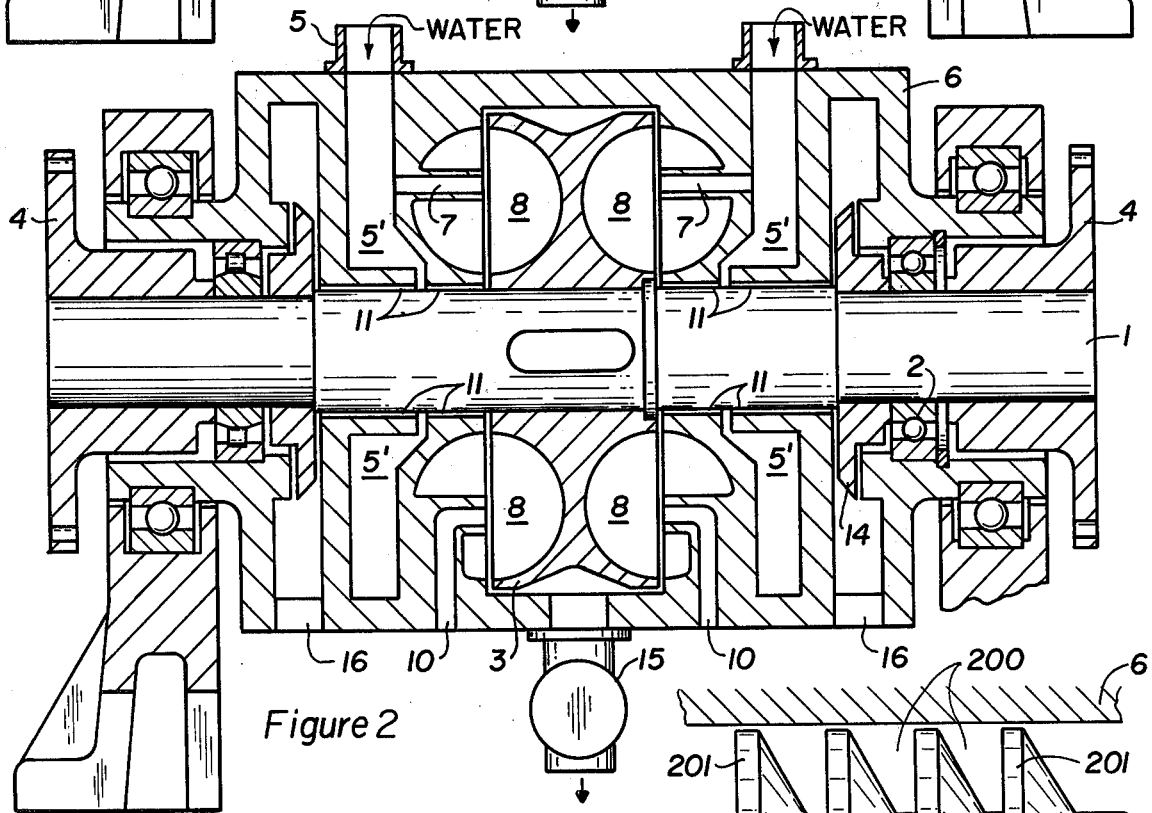
FIG. 2 illustrates an embodiment wherein the gap between the rotor shaft and the stator is connected through feedback conduit means to the liquid supply conduits which in turn lead substantially centrally into the eddy chamber.

FIG. 2 illustrates a further embodiment of the invention in which the basic structure is the same as that in FIG. 1. Accordingly the same elements are designated by the same reference numbers. The double rotor 3 rotates with the rotor shaft 1. Just in FIG. 1, the eddy chamber 8 is formed by the double rotor 3 and the housing 6 forming the stator which is supported for a pendulum type of motion. Between the inner diameter of the eddy chamber 8 and the leakage liquid discharge chambers 16 there extends a ring gap 11 around the rotor shaft 1 which serves for sealing purposes according to the invention. The width of the ring gap is preferably about 1/300th of the radius of the bore through which the rotational shaft extends. The feedback means of FIG. 2 comprise an inwardly reaching extension 5' of the water supply inlet port 5 and this extension 5' is directly connected to the ring gap 11. Thus, the supply conduit 7 and the inlet port 5 form simultaneously the supply means as well as the feedback means for the return of leakage water from the ring gap 11 to the center of the eddy chamber 8. Thus, the pressure in the extension chamber 5' corresponds to the conduit pressure of the water supplied into the port 5. Normally such pressure is about 0.2 bar. Thus, the pressure of the leakage water toward the leakage liquid discharge chambers 16 is also about 0.2 bar.

Thus, the pressure of the leakage water toward the discharge chambers 16 corresponds to this pressure of about 0.2 bar which means that the major proportion of the leakage water escaping at the inner circumference of the eddy chamber 8 and to the ring gap 11 is returned into the center of the eddy chamber 8 through the feedback means 5', 5, and 7.

In comparing the embodiments of FIGS. 1 and 2 it will be noted that the pressure between the inlet port 5 and the discharge chambers 16 is larger in FIG. 2 than the comparable pressure between the feedback chamber 12 and the leakage liquid discharge chamber 16 in FIG.

1. Further, the pressure in the feedback chamber 12 of FIG. 1 can be controlled by simple structural features such as properly dimensioning the width of the ring gap 11 and the diameter of the feedback conduit 13 whereby it is possible to reduce said leakage pressure so to speak almost down to zero. This is not quite possible in the embodiment of FIG. 2 because the leakage pressure cannot be less than the supply pressure at the supply port 5. However, the embodiment of FIG. 2 is also quite useful for many purposes especially since some control is also possible in FIG. 2 wherein the supply pressure is determined by the cross sectional area of the conduit 7 and by the quantity of water supplied. Such pressure may also be reduced where the eddy brake is operated only with a partial load that is, less water is supplied through the port 5. However, the supply pressure in FIG. 1 is also proportional to the load. In other words, if the embodiment of FIG. 1 is operated at a partial load the pressure in the feedback chamber 12 is also proportional to the load. That is, at the partial loads said pressure may be of less than about 0.05 bar and in addition it is independent of the quantity of water supplied. Thus, the embodiment of FIG. 2 has larger leakage losses. However, it has been found by practical experience that such high leakage can easily be kept away from the bearings 2 and the slightly larger operational costs are substantially compensated for by the simpler construction of the embodiment of FIG. 2 which results in lower initial costs. Thus depending on the individual needs or rather types of use one may select either the embodiment of FIG. 2 or that of FIG. 1 whereby in certain instances the embodiment of FIG. 2 may even be advantageous over that of FIG. 1.

Figure 3:
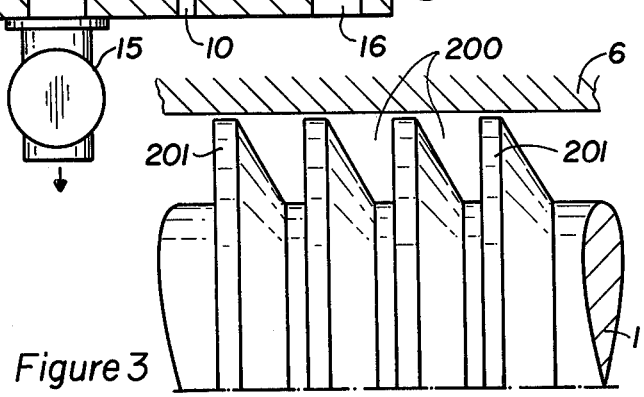
FIG. 3 shows a modification of the rotor shaft.

As mentioned, the present hydraulic eddy brakes without rubber elastic sealing means have about the same power rating as conventional eddy brakes of the same dimensions. By avoiding the rubber sealing means the present hydraulic eddy brakes have substantially longer operational periods between repairs which are about 5 times longer than respective operational times of conventional eddy brakes. Thus, there is a possibility, that so called boiler scale and other corrosion products may gradually lock the rotor shaft in the housing. Especially after prolonged periods in which the eddy brake is not used the rotor shaft might become locked so that substantial torque moments would be necessary to free the shaft again. For example, in a brake rated for 300 kilowatts the necessary torque moment for freeing the rotor shaft would be about 100Nm=74 lbf ft. By applying such torque to free the rotor shaft there is a possibility that damage might be done to the brake or to the measuring equipment. This can be avoided by providing the shaft 1 with a serrated surface as illustrated in FIG. 3. Grooves 200 may be cut for this purpose into the surface of the shaft 1 to provide the desired serration in the form of saw teeth.

Instead of cutting the grooves 200 directly into the shaft 1 it would also be possible to secure rings having a saw tooth shape or cross section to a round shaft. In any event the rings or the grooves would be equally spaced from each other. Instead of the rings, a busing with the serrations on its outer surface could be secured to the shaft. Here again the gap between the outer circmference of the rings 201 and the inner circumference of the bore in the housing 6 should be about 1/300th of the radius of the bore.

Instead of providing the serrations on the shaft 1 they may also be provided in he surface of the bore in the housing 6. In both instances, the serrations greatly facilitate the removal of any incrustations such as boiler scale or corrosion deposits. The serrations perform a grinding action whereby the work off incrustation or corrosion materials are of such a fine grain size that they are easily flushed out by the leakage water. The illustrated saw tooth serrations are especially advantageous in this respect. However, other serrations could also be used for example, rectangular or triangular serrations would also be suitable.

Although the invention has been described with reference to specific example embodiments, it will be appreciated, that it is intended to cover all modifications and equivalents within the scope of the appended claims.

What is claimed is:

1. A hydraulic eddy brake comprising stator means and rotor means including a rotor shaft, said stator means and said rotor means defining an eddy chamber having peripheral high pressure zones and a central low pressure zone, liquid supply means connected to supply liquid substantially centrally into said low pressure zone of said eddy chamber, said rotor shaft (1) supporting said rotor means, bearing means rotatably supporting said rotor shaft relative to said stator means, a smooth axial bore having a given inner diameter extending through said stator means, said rotor shaft extending axially through said bore, gap means (11) located substantially between the rotor shaft (1) and said stator means (6), leakage liquid discharge means (16) operatively connected to said gap means (11) and liquid feedback conduit means (12, 13: 5', 7) operatively and directly connecting said gap means (11) substantially centrally into said low pressure zone of said eddy chamber (8) whereby the pressure difference between the pressure in said central low pressure zone and the liquid leakage pressure in said gap means (11) is substantially minimized and a major proportion of the leakage liquid is returned into said central low pressure zone so that elastic sealing means between the rotor shaft and the stator means are obviated, said hydraulic eddy brake further comprising means secured to said rotor shaft and rotating with the rotor shaft for avoiding gradual locking of the rotor shaft by boiler scale and corrosion products, said locking avoiding means comprising a plurality of closed rings (201) spaced by closed grooves (200), said closed rings and closed grooves being operatively interposed between said rotor shaft (1) and said stator means (6) in gap means (11), said closed rings having a saw tooth cross section and an outer diameter smaller than said given inner bore diameter so that a spacing is provided between the rotor shaft and the stator means to form said gap means (11).

2. The hydraulic eddy brake according to claim 1, wherein said liquid feedback conduit means comprise a feedback chamber directly connected to said gap means.

3. The hydraulic eddy brake according to claim 1, wherein said liquid feedback conduit conduit means directly connect said gap means to said liquid supply means and through said liquid supply means substantially centrally and directly into said eddy chamber.

4. The hydraulic eddy brake according to claim 1, wherein said gap means extend around said rotor shaft between said rotor means proper and said bearing means.

5. The hydraulic eddy brake according to claim 1, wherein said rotor means comprise two eddy chamber sections arranged back to back relative to a central plane to form a double rotor.

6. The hydraulic eddy brake according to claim 1, wherein said spacing between said closed rings and said inner bore diameter has a width corresponding to about 1/300th of the radius of said bore.

7. The hydraulic eddy brake according to claim 1, wherein said stator means form a housing having sections of said eddy chamber therein, said eddy chamber sections in said housing extending mirror symmetrically relative to a central plane extending perpendicularly relative to the rotational axis of said rotor shaft means, said gap means having two sections extending on either side of said rotor means proper and toward said bearing means.

8. The hydraulic eddy brake according to claim 1, comprising further bearing means for rotatably supporting said stator means relative to said rotor means.

9. The hydraulic eddy brake according to claim 1, further comprising shield means covering said bearing means against leakage liquid.

10. The hydraulic eddy brake of claim 1, wherein said spacing being a constant width along the entire length of the gap means.

* * * * *